Oct. 19, 1948.　　　　G. T. HORTON　　　　2,451,486
VACUUM TANK FOR STORING LIQUIDS
AT HIGH OR LOW TEMPERATURES
Filed Sept. 1, 1944　　　　　　　　　　2 Sheets-Sheet 1

Inventor:
George T. Horton,
By Chritton, Wiles, Schroeder & Merriam,
Attys.

Oct. 19, 1948.  G. T. HORTON  2,451,486
VACUUM TANK FOR STORING LIQUIDS
AT HIGH OR LOW TEMPERATURES
Filed Sept. 1, 1944  2 Sheets-Sheet 2
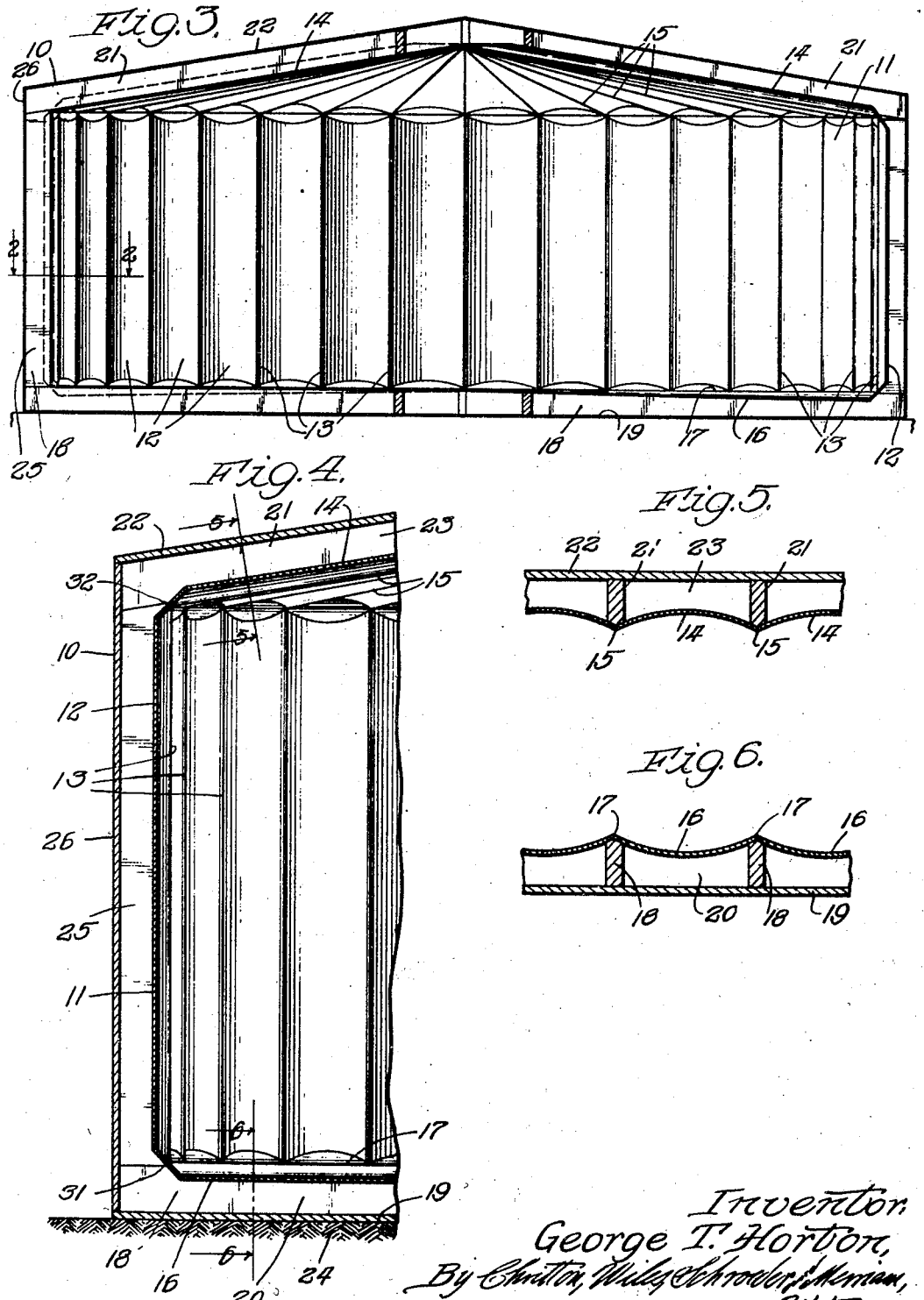
Inventor
George T. Horton,

Patented Oct. 19, 1948

2,451,486

UNITED STATES PATENT OFFICE 2,451,486

VACUUM TANK FOR STORING LIQUIDS AT HIGH OR LOW TEMPERATURES

George T. Horton, Chicago, Ill., assignor to Chicago Bridge & Iron Company, a corporation of Illinois Application September 1, 1944, Serial No. 552,289

1 Claim. (Cl. 220—9)

This invention relates to a vacuum storage tank for storing liquids at high or low temperatures.

The invention is primarily directed to large tanks such as may be employed for the storage of liquefied hydrocarbon gases at temperatures as low as —260° F. In the tank herein described, the weight of the liquid is carried by a thin inner membrane of metal which is not susceptible to heat or cold. Such metals are relatively expensive, the common metals being nickel or Monel metal. This membrane is supported at a plurality of points by non-conductive (or insulating) supporting members which transmit the outward components of the stresses to an outer metal wall which may be composed of ordinary carbon steel. The space between the supporting members, the outer wall and the inner membrane, is open and is preferably evacuated.

In its preferred form the tank is substantially in the form of an upright cylinder. The inner side walls of the tank comprise a series of intersecting circular segments or scallops which intersect on substantially vertical lines. The bottom and roof membranes are in the form of radial cone segments intersecting with the scallops at their point of intersection.

Figure 1:
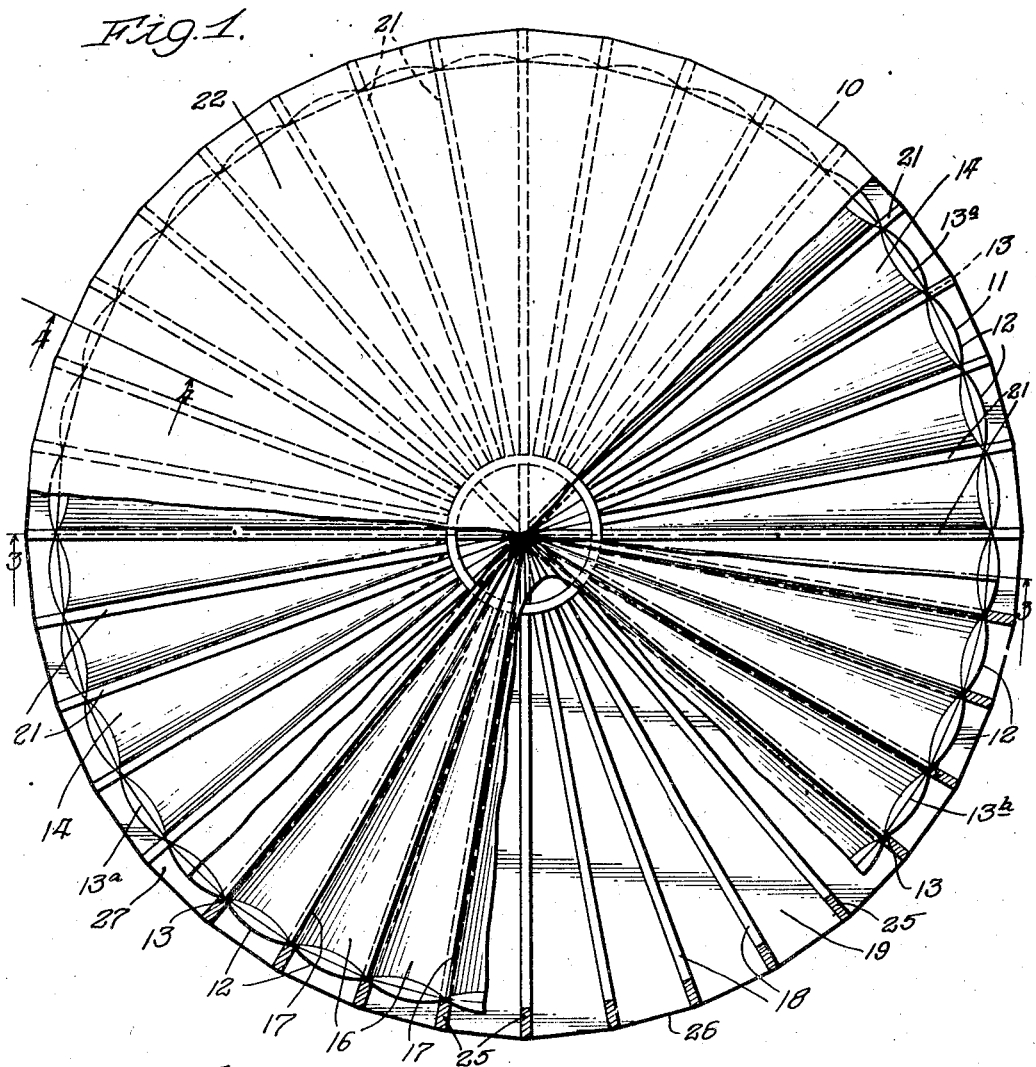
Figure 2:
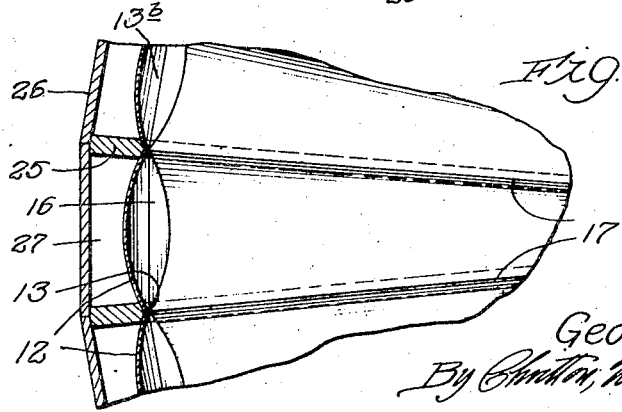

The invention is illustrated in the drawings in which Figure 1 is a plan view of the tank partly in section; Figure 2 is a fragmentary section taken along the line 2—2 in Fig. 3; Figure 3 is a vertical sectional view taken along the line 3—3 in Fig. 1; Figure 4 is a fragmentary vertical section taken along the line 4—4 in Fig. 1; Figure 5 is a fragmentary section taken along the line 5—5 in Fig. 4; and Figure 6 is a fragmentary section taken along the line 6—6 in Fig. 4.

The tank 10 which is generally cylindrical in form comprises an inner membrane 11 which is gas-tight. This membrane is made up of a series of intersecting scallops 12 which form the side walls which intersect on lines 13 which are generally substantially vertical. The roof is made up of radial cone members 14 which intersect with each other along radii 15 and intersect with the scallops 12 along their lines of intersection 13a. The bottom membrane is made up of similar radial cone members 16 intersecting along radii 17. These members also join the scallops at the intersections 13b.

The membrane is supported at the bottom along the lines of intersection 17 by radial walls 18 of non-conducting or insulating material. A suitable material is an insulating, non-metallic composition known as Marinite which has an asbestos base. These walls may rest upon a carbon steel floor with a suitably spread foundation 24 of concrete.

The space 20 between the bottom 19, the walls 18 and the membrane 16 is preferably evacuated to produce a substantially complete vacuum.

The roof membrane of the tank is supported by radial beams of insulating material 21 such as Marinite and this in turn transmits upward stresses to the carbon steel roof 22.

The side scallop membranes 12 are supported at their points of intersection by insulating posts or studs 25 which transmit the outward components of the scallop stresses to an outer steel shell 26. The spaces 27 left between the wall 26 and the bottom, side and top scallops are preferably evacuated as is the space 23 similarly remaining in the roof sections. It may in some instances, however, be desirable to carry subnormal atmospheric pressure in these openings. This may be accomplished by inserting an insulating composition in the openings in such a way as not to interfere with expansion and contraction of the membrane scallops or cusps. This may be done, for example, by using a solid insulation and filling only that portion of the space never occupied by the inner membrane.

The scallops are formed with a relatively small radius of curvature $r$. This is likewise true of the radial cone section 16 in the bottom. When the tank is operating under full load, the bottom membranes 16 will obviously be carrying the entire load plus whatever vacuum is present in the openings 20. If the liquid is carried under a gas pressure, this gas pressure will also be effectual against the membrane. The scallops on the sides will carry a similar load which will decrease upwardly. The roof membranes 14 will carry only gas pressure. The membrane segments may be made of equal thickness, but with varying radius of curvature $r$ to give constant stress, or the radius $r$ may be constant and the thickness of the membranes varied in accordance with the stress.

The outer carbon steel wall is made up in the form of chords between the Marinite supports. When there is no liquid in the tank but atmospheric pressure exists therein, the outer shell side and the roof will be in compression from wall to wall because the total inward air pressure on the outer carbon steel side and roof will be somewhat more than the total outward air pressure on the inner shell side and roof. To overcome this, it is desirable in some instances to install stiffeners on the outer shell side and roof running from Marinite wall to Marinite wall. When, however, there is liquid in the tank there will be, in general, circumferential tension in the outer shell side plates. This is likewise true if there is internal gas pressure appreciably higher than atmospheric.

The roof is supported by any suitable means such as exterior trusses or interior posts (not shown).

Temperature changes either of expansion or contraction of the inner tank may take place independently of the outer tank. If the inner tank expands relatively to the outer one, the scallops will simply get deeper. If it contracts the scallops will get shallower.

The vacuum or reduced pressure between the inner and outer tanks may be produced and maintained in any desired manner as by a pump.

In the form shown the tank is generally cylindrical with a substantially circular outline and plan. The side walls are actually, however, polygonal. The bottom of the tank is shown flat and the roof pyramidal. The roof, however, may be domed if desired. The outer shell is, of course designed to resist any load transmitted to it from the inner shell, plus the outer air pressure.

Reflective coatings may be employed on the inner or outer shells, or both, to reduce radiant heat entering or leaving the inner tank.

The bottom of the tank may be suitably insulated from the ground, particularly where the ground is likely to be wet. This may be accomplished, for example, by leaving an open air space between the tank bottom and the ground through which air may circulate.

As shown in the drawings, the corners 31 between the bottom and side membrane cusps and similarly the corners 32 between the side and top are flattened to facilitate welding thereof together. The side walls, however, may be curved to permit merging of the top, bottom and sides.

Other forms of the invention, not illustrated, may be employed. For example, the base or roof may be supported by concentric circular walls, by rectangularly arranged supports, or combinations thereof. The side walls may be supported by rectangularly or curvilinearly arranged supports, although such arrangements are more difficult to construct.

The foregoing detailed description has been given for clearness of understanding only, and no unnecessary limitations should be understood therefrom.

What I claim as new, and desire to secure by Letters Patent, is:

A storage vessel comprising an inner pressure shell of thin material capable of retaining a substantial part of its strength at extreme temperatures, said inner shell having side walls comprising vertical intersecting cylindrical sections concave inwardly and said inner shell having bottom and top walls comprising intersecting radially arranged conical sections concave inwardly, said cylindrical sections and said conical sections being subjected to tensional forces only, an outer shell of sheet metal for supporting the inner shell, said outer shell having side walls comprising a plurality of vertical panels arranged in the form of a polygon having the same number of sides as there are cylindrical sections in the inner vessel, insulating supports extending between the intersection of cylindrical sections and the adjacent intersection of vertical panels, said outer shell having a bottom and a top, insulating supports extending between the intersections of the conical sections in the top walls and the top of the outer vessel and insulating supports extending between the intersections of the conical sections in the bottom walls and the bottom of the outer vessel, the inner shell being free to expand or contract by change of its radius of curvature in each of said sections.

GEORGE T. HORTON.

REFERENCES CITED

The following references are of record in the file of this patent:

UNITED STATES PATENTS

| Number | Name | Date |
|---|---|---|
| 150,832 | Crane | May 12, 1874 |
| 720,924 | Intze | Feb. 17, 1903 |
| 1,408,829 | Rial | Mar. 7, 1922 |
| 1,654,016 | Salmon | Dec. 27, 1927 |
| 1,675,354 | Kemper | July 3, 1928 |
| 1,730,153 | Lindsay | Oct. 1, 1929 |
| 1,755,176 | Feldmeier | Apr. 22, 1930 |
| 1,864,931 | Pritchard | June 28, 1932 |
| 2,012,964 | Horton | Sept. 3, 1935 |
| 2,263,943 | Barnes | Nov. 25, 1941 |
| 2,313,997 | Jackson | Mar. 16, 1943 |
| 2,329,765 | Jackson et al. | Sept. 21, 1943 |
| 2,386,958 | Jackson | Oct. 16, 1945 |
| 2,393,964 | Boardman | Feb. 5, 1946 |

FOREIGN PATENTS

| Number | Country | Date |
|---|---|---|
| 750,066 | France | May 15, 1933 |